(12) United States Patent
Sehgal

(10) Patent No.: US 12,521,068 B2
(45) Date of Patent: Jan. 13, 2026

(54) SYSTEM AND METHOD OF ESTIMATING VITAL SIGNS OF USER USING ARTIFICIAL INTELLIGENCE

(71) Applicant: Nikhil D Sehgal, Denham (GB)

(72) Inventor: Nikhil D Sehgal, Denham (GB)

(*) Notice: Subject to any disclaimer, the term of this patent is extended or adjusted under 35 U.S.C. 154(b) by 361 days.

(21) Appl. No.: 17/698,880

(22) Filed: Mar. 18, 2022

(65) Prior Publication Data
US 2023/0293113 A1    Sep. 21, 2023

(51) Int. Cl.
*A61B 5/00* (2006.01)
*A61B 5/0205* (2006.01)
*A61B 5/024* (2006.01)
*A61B 5/0295* (2006.01)
*A61B 5/08* (2006.01)
*A61B 5/16* (2006.01)
*G06V 10/25* (2022.01)
(Continued)

(52) U.S. Cl.
CPC .......... *A61B 5/7264* (2013.01); *A61B 5/0205* (2013.01); *A61B 5/02416* (2013.01); *A61B 5/0295* (2013.01); *A61B 5/0816* (2013.01); *A61B 5/165* (2013.01); *A61B 5/7257* (2013.01); *G06V 10/25* (2022.01); *G06V 10/50* (2022.01); *G06V 20/46* (2022.01); *G06V 40/161* (2022.01)

(58) Field of Classification Search
CPC . A61B 5/7264; A61B 5/0205; A61B 5/02416; A61B 5/0295; A61B 5/0816; A61B 5/165; A61B 5/7257; G06V 10/25; G06V 20/46; G06V 40/161; G06V 10/50
See application file for complete search history.

(56) References Cited

U.S. PATENT DOCUMENTS

| 2015/0154229 A1 | 6/2015 | An et al. |
| 2017/0238860 A1 | 8/2017 | El Kaliouby et al. |

(Continued)

FOREIGN PATENT DOCUMENTS

| CN | 111127511 A | 5/2020 |
| CN | 114557685 A | 5/2022 |

(Continued)

OTHER PUBLICATIONS

Combined Search and Examination Report under Sections 17 and 18(3) issued for United Kingdom Patent Application GB2104538.0, on Nov. 11, 2021, 13 Pages.

(Continued)

*Primary Examiner* — Carl H Layno
*Assistant Examiner* — Aya Ziad Bakkar
(74) *Attorney, Agent, or Firm* — RC Trademark Company

(57) ABSTRACT

Disclosed is a system and processor-implemented method of estimating one or more vital signs of a user based on a video of the user by using artificial intelligence, comprising extracting a plurality of face frames and one or more time stamps from the video of the user; determining at least one region of interest (ROI) in the plurality of face frames using a histogram of oriented gradients (HOG); extracting a plurality of health indicator signals by detecting volumetric changes in a peripheral blood circulation in the at least one ROI based on a remote photoplethysmography (RPPG); and estimating the one or more vital signs of the user based on the plurality of health indicator signals and the one or more time stamps.

10 Claims, 5 Drawing Sheets

(51) Int. Cl.
*G06V 10/50* (2022.01)
*G06V 20/40* (2022.01)
*G06V 40/16* (2022.01)

(56) References Cited

U.S. PATENT DOCUMENTS

2020/0085312 A1      3/2020  Tzvieli et al.
2020/0175262 A1 *   6/2020  Pitre ................... G06V 40/172
2020/0245873 A1      8/2020  Frank et al.

FOREIGN PATENT DOCUMENTS

JP            2013058060 A        3/2013
WO      WO-2018160963 A1 *   9/2018   ........... A61B 5/0064
WO            2020003910 A1       1/2020
WO      WO-2021257737 A1 *  12/2021   ......... A61B 5/02055

OTHER PUBLICATIONS

Examination Report under Section 18(3) issued for United Kingdom Patent Application GB2104538.0, on Apr. 19, 2024, 05 Pages.

* cited by examiner

SYSTEM AND METHOD OF ESTIMATING VITAL SIGNS OF USER USING ARTIFICIAL INTELLIGENCE

TECHNICAL FIELD

The present disclosure generally relates to remote medical diagnosis. More particularly, the present disclosure relates to systems and methods for estimating one or more vital signs of a user based on a video of the user by using artificial intelligence.

BACKGROUND

Currently, due to the COVID-19 pandemic, patients with COVID-19 typically experience symptoms such as a fever, cough, shortness of breath, all of which can be quantitatively measured through physiological signs. Numerous medical research organizations have shown that an abnormally high pulse rate (greater than 100 beats per minute), respiratory rate (greater than 30 respirations per minute) as well as an abnormally low oxygen saturation level (less than 94 percent) are consistent with features present in patients with severe viral infections. Providing an easy and effective way to measure these features on the go can be supportive to wellbeing during this difficult time. Remote health consultations via phone or video call have become common due to the pandemic, however existing remote health consultation techniques fail to measure health & wellness objectively and also rely on subjective information or completion of lengthy questionnaires that aim to give a diagnosis based on symptoms.

Moreover, vital signs such as heart rate, blood pressure, and respiration rate are typically measured using equipment such as a chest strap transmitter, strapless heart rate monitors and the like.

However, such an equipment is not particularly accurate, is susceptible to noise, does not provide much detail. Additionally, such an equipment does not provide results instantly within a few seconds. Also, conventional techniques measuring vital signs require close access and direct physical contact with the body of a human subject, typically with the arm of the subject. This contact requires that the subject is compliant and aware that a measurement, such as blood pressure measurement is underway.

Therefore, in light of the foregoing discussion, there is a need to overcome the aforementioned drawbacks associated with the existing techniques for providing a method and a system of estimating one or more vital signs of a user based on a video of the user by using artificial intelligence.

SUMMARY

The present disclosure seeks to provide a method of estimating one or more vital signs of a user based on a video of the user by using artificial intelligence. The present disclosure also seeks to provide a system of estimating one or more vital signs of a user based on a video of the user by using artificial intelligence. An aim of the present disclosure is to provide a solution that overcomes at least partially the problems encountered in prior art by providing a non-invasive technique of estimating one or more vital signals of the user from the video of the user based on a remote photoplethysmography (RPPG) using artificial intelligence (AI) that facilitates faster and accurate remote estimation 25 of vital signals of the user.

In one aspect, an embodiment of the present disclosure provides a system for estimating one or more vital signs of a user based on a video of the user using artificial intelligence, the system comprising:
 a video capture device associated with a computing device for capturing the video of the user;
 a memory operatively coupled to the video capture device and configured to store a set of modules and the video of the user; and
 a processor that executes the set of modules for estimating the one or more vital signs of the user based on the video of the user using artificial intelligence, the modules comprising:
  a face frame extraction module for extracting a plurality of face frames and one or more time stamps from the video of the user;
  a ROI determination module for determining at least one region of interest (ROI) in the plurality of face frames using a histogram of oriented gradients;
  a signal extraction module for extracting a plurality of health indicator signals by detecting volumetric changes in a peripheral blood circulation in the at least one ROI based on a remote photoplethysmography (RPPG); and
  a vital sign estimation module for estimating the one or more vital signs of the user based on the plurality of health indicator signals and the one or more time stamps.

In another aspect, the present disclosure provides a processor implemented method of estimating one or more vital signs of a user based on a video of the user by using artificial intelligence, said method comprising:
 extracting a plurality of face frames and one or more time stamps from the video of the user;
 determining at least one region of interest (ROI) in the plurality of face frames using a histogram of oriented gradients (HOG);
 extracting a plurality of health indicator signals by detecting volumetric changes in a peripheral blood circulation in the at least one ROI based on a remote photoplethysmography (RPPG); and estimating the one or more vital signs of the user based on the plurality of health indicator signals and the one or more time stamps.

Embodiments of the present disclosure substantially eliminate or at least partially address the aforementioned problems in the prior art, and provide a non-invasive technique of estimating one or more vital signals of the user from the video of the user based on a remote photoplethysmography (RPPG) using artificial intelligence (AI) that facilitates faster and accurate remote estimation of vital signals of the user.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
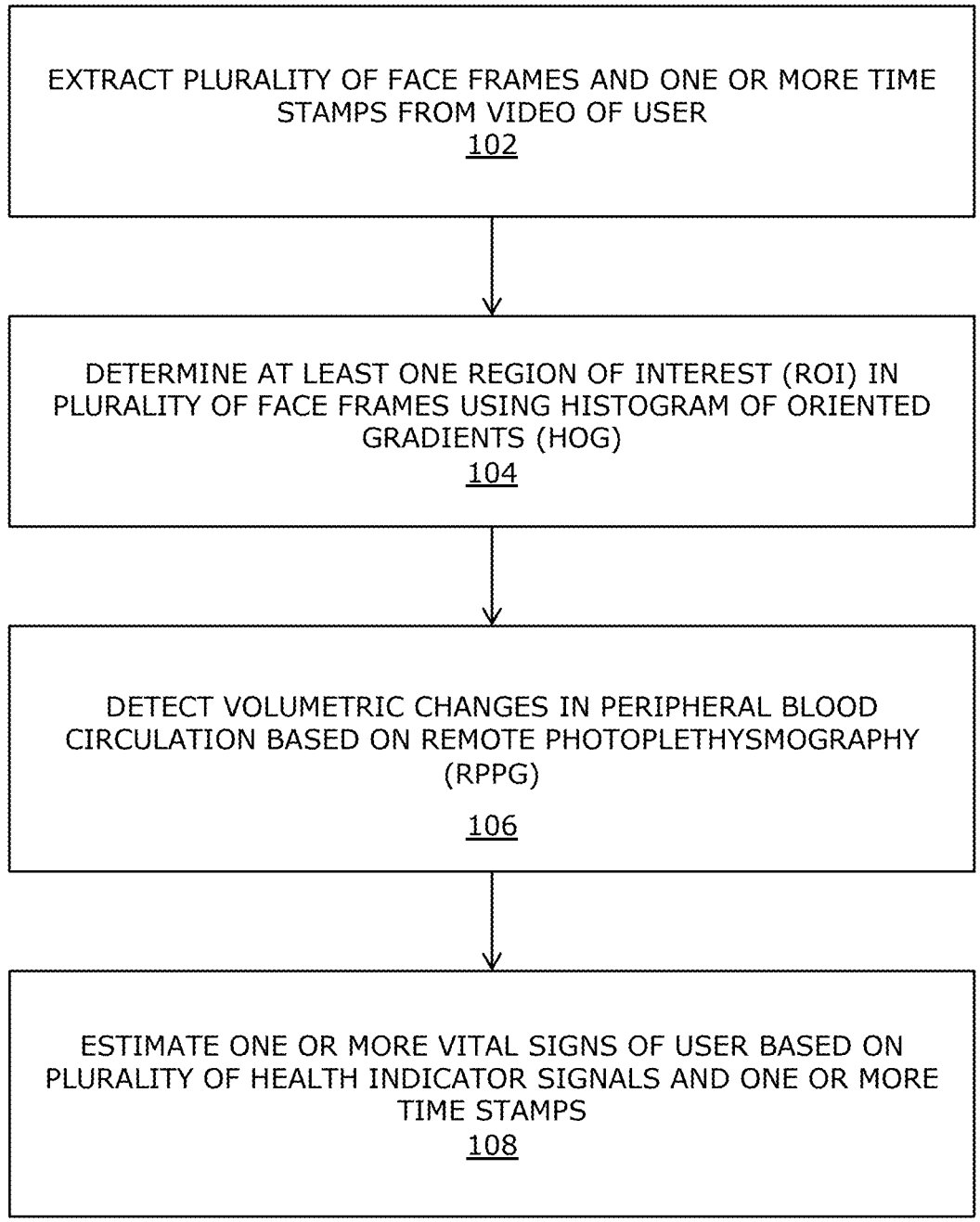
FIG. 1 illustrates steps of a processor-implemented method of estimating one or more vital signs of a user based on a video of the user by using artificial intelligence, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the nonunderlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for estimating one or more vital signs of a user based on a video of the user using artificial intelligence, the system comprising:
  a video capture device associated with a computing device for capturing the video of the user;
  a memory operatively coupled to the video capture device and configured to store a set of modules and the video of the user; and
  a processor that executes the set of modules for estimating the one or more vital signs of the user based on the video of the user using artificial intelligence, the modules comprising:
    a face frame extraction module for extracting a plurality of face frames and one or more time stamps from the video of the user;
    a ROI determination module for determining at least one region of interest (ROI) in the plurality of face frames using a histogram of oriented gradients;
    a signal extraction module for extracting a plurality of health indicator signals by detecting volumetric changes in a peripheral blood circulation in the at least one ROI based on a remote 25 photoplethysmography (RPPG); and
    a vital sign estimation module for estimating the one or more vital signs of the user based on the plurality of health indicator signals and the one or more time stamps.

In another aspect, the present disclosure provides a method of estimating one or more vital signs of a user based on a video of the user by using artificial intelligence, said method comprising:
  extracting a plurality of face frames and one or more time stamps from the video of the user;
  determining at least one region of interest (ROI) in the plurality of face frames using a histogram of oriented gradients (HOG);
  extracting a plurality of health indicator signals by detecting volumetric changes in a peripheral blood circulation in the at least one 10 ROI based on a remote photoplethysmography (RPPG); and
  estimating the one or more vital signs of the user based on the plurality of health indicator signals and the one or more time stamps.

The present disclosure provides a processor-implemented method and system for estimating one or more vital signs of a user based on a video of the user by using artificial intelligence. In various embodiments, a plurality of health indicator signals are extracted from the video by detecting volumetric changes in a peripheral blood circulation in at least one region of interest based on a remote photoplethysmography (RPPG) and one or more vital signs are estimated based on the plurality of health indicator signals. The processor-implemented method of the present, disclosure provides a non-invasive, accurate and faster technique of estimating one or more vital signals of the user based on RPPG.

Further, the processor-implemented method of the present disclosure provides an easy to use, entirely contactless, fast and cost-effective remote health and wellness solution that uses artificial intelligence to enable the user to keep track of their vital signs and relay the information associated with the vital signs to various patient clinical data management systems. Moreover, the processor-implemented method and system of the present disclosure provides a seamless process with existing infrastructure facilitating an enhanced transparency at existing touchpoints, such as check-in pods or at passport control by implementing user friendly health & wellness measures.

Additionally, the processor-implemented method and system of the present disclosure provides ability to the users (such as, for example air passengers and crew members) to conduct a quick & easy health awareness check from anywhere using a video capture device. Also, the processor-implemented method and system of the present disclosure enables measuring vital signs of a user at any time, including while on the call, and send the data directly to a virtual physician or doctor during a consultation without the need to rely on subjective information or complete lengthy questionnaires that aim to give them a diagnosis based on symptoms.

Moreover, the processor-implemented method and system of the present disclosure facilitates an improvement of health and wellness remotely, supports wellness of an entire workforce remotely, makes health and wellbeing assessments more accessible worldwide and increases a self-awareness of potential health issues. Therefore, the present disclosure enables expedited identification of a disease related symptoms, such as of COVID-19 or other pandemic diseases, and screening of individuals thereafter. Such expedited identification of symptoms allows authorities to actively monitor and control spread of the pandemic, thereby allowing better response to the pandemic.

Furthermore, with faster screening times, persons infected with the diseases can be restricted from boarding airplanes or passenger ships, thereby allowing a reduction in $CO_2$ emissions.

The method comprises extracting a plurality of face frames and one or more time stamps from the video of the user. In an embodiment, the video includes a real-time video of a face of the user captured for instance, through a mobile phone of the user. In an embodiment, the plurality of face frames are detected using an OpenCV Haar classifier. Notably, the time stamps are used to provide more accuracy of image processing, to fix frames per second (FPS) problems and improve library accuracy.

Optionally, the video of the user is received from a video capture device and the video is analyzed for detecting the plurality face frames and the one or more time stamps in the video. Examples of the video capture device, include, but is not limited to, a camera, a video camera, a camcorder, a camera associated with mobile devices, and the like. In an embodiment, one or more predetermined configuration parameters are used to determine the plurality of face frames by detecting face in the video.

The method comprises determining at least one region of interest (ROI) in the plurality of face frames using a histogram of oriented gradients (HOG). As used herein the term "HOG" refers to a feature descriptor used in computer vision and image processing for the purpose of object detection. Notably, the HOG technique counts occurrences of gradient orientation in localized portions of an image. HOG is similar to that of edge orientation histograms, scale-invariant feature transform descriptors, and shape contexts, but differs in that it is computed on a dense grid of uniformly spaced cells and uses overlapping local contrast normalization for improved accuracy. The HOG operates on local cells and is therefore invariant to geometric and photometric transformations and HOG is thus particularly suited for human detection in images.

Optionally, determining at least one ROI comprises generating at least one cropped face image and extracting, using the HOG, one or more HOG features from the at least one cropped face image, wherein the one or more HOG features comprises HOG descriptors for object recognition by a machine learning model and determining, at least one face landmark, a corrected face location and the at least one ROI in the corrected face location, by the machine learning model using the one or more HOG features. In an embodiment, a local binary feature 5 algorithm is used to localize the at least one ROI.

The method comprises extracting a plurality of health indicator signals by detecting volumetric changes in a peripheral blood circulation in the at least one ROI based on a remote photoplethysmography (RPPG). The term "RPPG" as used herein refers to a simple optical technique used to detect volumetric changes in blood in peripheral circulation. RPPG is a low cost and non-invasive method that makes measurements at the surface of the skin by detecting volumetric changes in a peripheral blood circulation based on analyzing at least one ROI. In an embodiment, subtle changes in light absorption from the skin are measured using the RPPG technology and the plurality of health indicator signals are extracted based on the measured subtle changes in light absorption. In an embodiment, one or more pulse color changes in the skin of the user is detected using a multi-wave RGB camera and RPPG. The pulse color changes are encoded within the changes in pixel values of the video for extracting the health indicator signals. The RPPG technique has the benefit of being a low cost, simple and portable technology.

Optionally, extracting the plurality of health indicator signals comprises determining the volumetric changes in blood in peripheral circulation in the at least one ROI, and generating the plurality of health indicator signals comprising a plurality of bandgap reference (BGR) signals by processing at least one of: the corrected face location, the at least one ROI, and the plurality of face landmarks based on the volumetric changes in blood in peripheral circulation.

The method comprises estimating the one or more vital signs of the user based on the plurality of health indicator signals and the one or more time stamps. As used herein the term "vital signs" refers to a group of important medical signs that indicate the status of vital (life-sustaining) functions of a body. Notably vital sign measurements are taken to help assess the general physical health of a person, give clues to possible diseases, and show progress toward recovery. The normal ranges for vital signs of a person vary with age, weight, gender, and overall health. Optionally, the one or more vital signs comprises at least one of: a heart rate, a respiration rate, a stress level, an oxygen saturation and a blood pressure.

Optionally, for estimating the one or more vital signs, the health indicator signals are interpolated with the one or more timestamps. A batch is executed with balancing parameters using the health indicator signals to generate a fast Fourier transform (FFT) spectrum. A signal to noise ratio (SNR) is estimated based on the FFT spectrum to generate an estimated SNR. A spectrum is selected with a highest SNR based on the estimated SNR and generating at least one balanced signal with the spectrum with the highest SNR. One or more peaks are detected in the at least one balanced signal and filtering one or more weak peaks from among the one or more peaks to generate a filtered signal. The one or more vital signs are estimated based on the filtered signal. It will be appreciated that, one or more features are extracted from the one or more peaks in the filtered signal and a value of at least one of: a blood pressure, a heart rate, a respiration rate, a stress level, and an oxygen saturation is predicted based on the one or more features, for estimating the one or more vital signs. In an embodiment, a pre-trained regression tree model is used for estimating the one or more vital signs based on the filtered signal. In an embodiment, the at least one face landmark along with the estimated one or more vital signs are rendered to the user via a user interface of the user device.

The present disclosure also relates to the system as described above. Various embodiments and variants disclosed above apply mutatis mutandis to the system. The system of the present disclosure estimating one or more vital signs of a user based on a video of the user using artificial intelligence by detecting volumetric changes in a peripheral blood circulation in at least one region of interest based on a remote photoplethysmography (RPPG). The system of the present disclosure provides a non-invasive, accurate and faster technique of estimating one or more vital signals of the user based on RPPG. Further, the system of the present disclosure provides an easy to use, entirely contactless, fast and cost-effective remote health and wellness solution that uses artificial intelligence to enable anyone to keep track of their vital signs and relay the information associated with the vital signs to various patient clinical data management systems. Moreover, the system of the present disclosure facilitates a seamless process with existing infrastructure providing an enhanced transparency at existing touchpoints, such as check-in pods or at passport control by implementing user friendly health & wellness measures. Additionally, the system of the present disclosure provides ability to the users (such as, for example air passengers and crew members) to conduct a quick & easy health awareness check from anywhere using just a mobile device. Also, the system of the present disclosure enables measuring vital signs of a user at any time, including while on the call, and send the data directly to a virtual physician or doctor during a consultation without the need to rely on subjective information or complete lengthy questionnaires that aim to give them a diagnosis based on symptoms.

Additionally, the system of the present disclosure facilitates an improvement of health and wellness remotely, supports wellness of an entire workforce remotely, makes health and wellbeing assessments more accessible worldwide and increases a self-awareness of potential health issues. Moreover, the system of the present disclosure provides auditable data records (e.g., corporate level data infrastructure) to keep clear records, provides a secure data platform (e.g., authorized for personal medical records) and can be provided in the form of an app (application) that can be downloaded quickly, safely and remotely into devices of the users.

The system comprises a video capture device associated with a computing device for capturing the video of the user. The term "video capture device" refers to a device configured to capture a video of a user and can include, for example, video camera, a camcorder, a camera of a mobile device, and the like. Examples of the computing device include, but are not limited to, a mobile phone, a laptop, a desktop, a tablet computer, and the like. The system also comprises a memory operatively coupled to the video capture device and configured to store a set of modules and the video of the user, and a processor that executes the set of modules for estimating the one or more vital signs of the user based on the video of the user using artificial intelligence. The set of modules comprises a face frame module, a ROI determination module, a signal extraction module, and a vital sign estimation module.

The face frame extraction module is configured to extract a plurality of face frames and one or more time stamps from the video of the user. The ROI determination module is configured to determine at least one region of interest (ROI) in the plurality of face frames using a histogram of oriented gradients. The signal extraction module is configured to extract a plurality of health indicator signals by detecting volumetric changes in a peripheral blood circulation in the at least one ROI based on a remote photoplethysmography (RPPG). The vital sign estimation module is configured to estimate the one or more vital signs of the user based on the plurality of health indicator signals and the one or more time stamps. The one or more vital signs comprises at least one of: a heart rate, a respiration rate, a stress level, an oxygen saturation and a blood pressure.

Optionally, the face frame extraction module is further configured to receive the video of the user from the video capture device and analyze the video for detecting the one or more face frames and the one or more time stamps in the video.

Optionally, the ROI determination module is further configured to a) crop the plurality of face frames for generating at least one cropped face image, b) extract, using the histogram of oriented gradients (HOG), one or more HOG features from the at least one cropped face image, wherein the one or more HOG features comprises HOG descriptors for object recognition, and c) determine, at least one face landmark, a corrected face location and the at least one ROI in the corrected face location using the one or more HOG features.

Optionally, the signal extraction module is further configured to a) determine the volumetric changes in blood in peripheral circulation in the at least one ROI and b) generate the plurality of health indicator signals comprising a plurality of bandgap reference (BGR) signals by processing at least one of: the corrected face location, the at least one ROI, and the one or more face landmarks based on the volumetric changes in blood in peripheral circulation.

Optionally, the vital sign estimation module is further configured to a) interpolate the health indicator signals with the one or more timestamps, b) execute a batch with balancing parameters using the health indicator signals to generate a fast Fourier transform (FFT) spectrum, estimate a signal to noise ratio (SNR) based on the FFT spectrum to generate an estimated SNR, c) select a spectrum with a highest SNR based on the estimated SNR and generate at least one balanced signal with the spectrum with the highest SNR, d) detect one or more peaks in the at least one balanced signal and filter one or more weak peaks from among the one or more peaks to generate a filtered signal and e) estimate the one or more vital signs based on the filtered signal.

Optionally, the vital sign estimation module is further configured to extract one or more features from the one or more peaks in the filtered signal and predict a value of at least one of: a blood pressure, a heart rate, a respiration rate, a stress level, and an oxygen saturation based on the one or more features.

The present disclosure further provides a computer program product comprising a non-transitory computer-readable storage medium having computer-readable instructions stored thereon, the computer readable instructions being executable by a computerized device comprising processing hardware to execute the method as described above.

The present disclosure further provides a method of determining one or more vital health indicators of a user based on a video of the user by using artificial intelligence, said method comprising:
  extracting one or more face frames in the video of the user; —determining one or more face landmarks from the one or more face frames for extracting one or more health trigger indicators;
  measuring subtle changes in a light absorption in the skin of the user from the one or more face landmarks for extracting a plurality of physiological signals; and
  converting the plurality of physiological signals into the one or more vital health indicators based on a remote photoplethysmography (RPPG) technique.

DETAILED DESCRIPTION OF THE DRAWINGS

Referring to FIGS. 1 to 4, FIG. 1 illustrates steps of a processor-implemented method of estimating one or more vital signs of a user based on a video of the user by using artificial intelligence, in accordance with an embodiment of the present disclosure.

At step 102, a plurality of face frames and one or more time stamps are extracted from the video of the user. At step 104, at least one region of interest (ROI) is determined in the plurality of face frames using a histogram of oriented gradients (HOG). At step 106, a plurality of health indicator signals are extracted by detecting volumetric changes in a peripheral blood circulation in the at least one ROI based on a remote photoplethysmography (RPPG). At step 108, one or more vital signs of the user are estimated based on the plurality of health indicator signals and the one or more time stamps.

The steps 102, 104, 106, and 108, are only illustrative and other alternatives can also be provided where one or more steps are added, one or more steps are removed, or one or more steps are provided in a different sequence without departing from the scope of the claims herein.

Figure 2A:
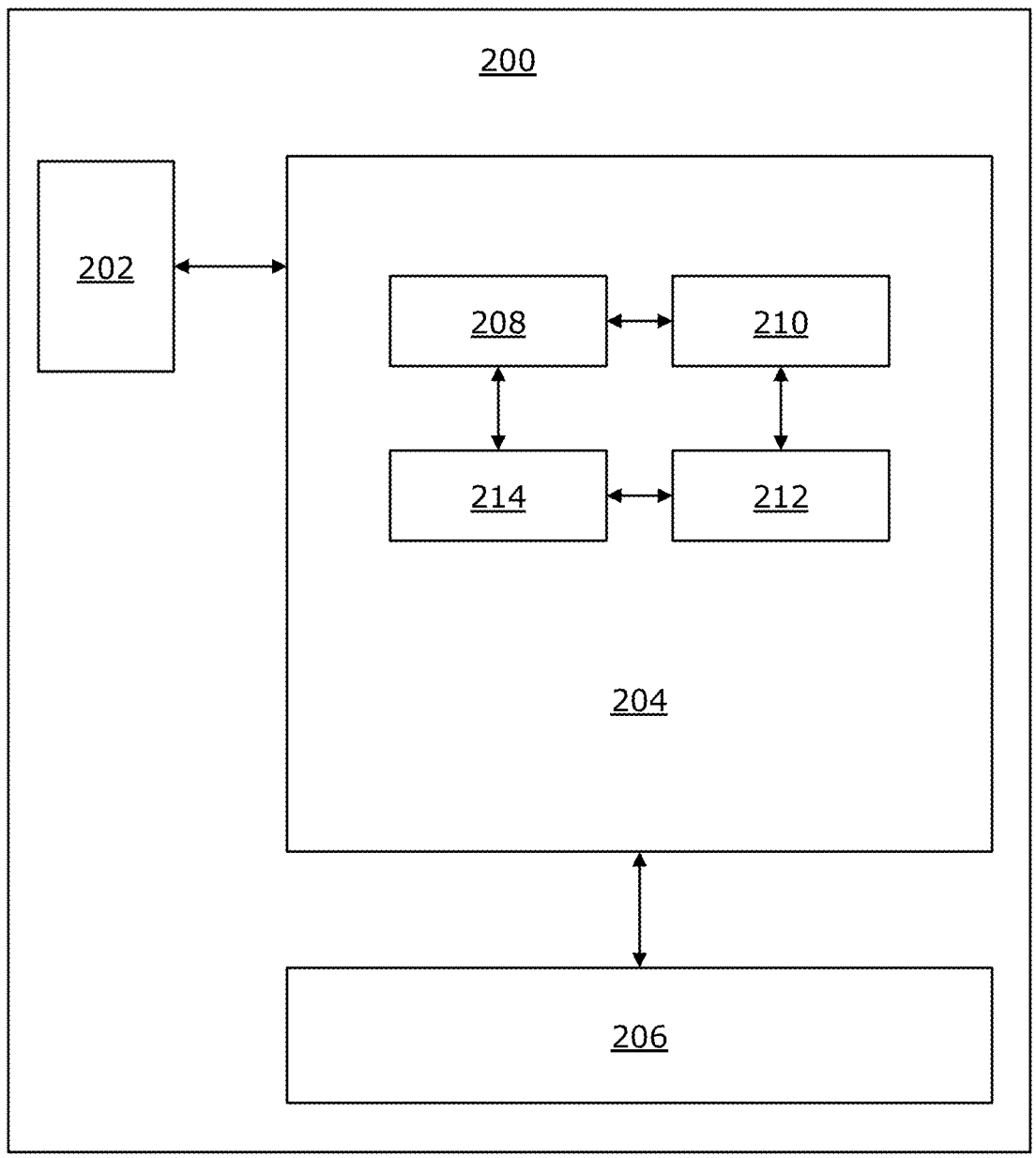
FIG. 2A depicts a schematic illustration of a system for determining one or more vital signs of a user based on a video of the user by using artificial intelligence, in accordance with an embodiment of 10 the present disclosure.
Figure 2B:
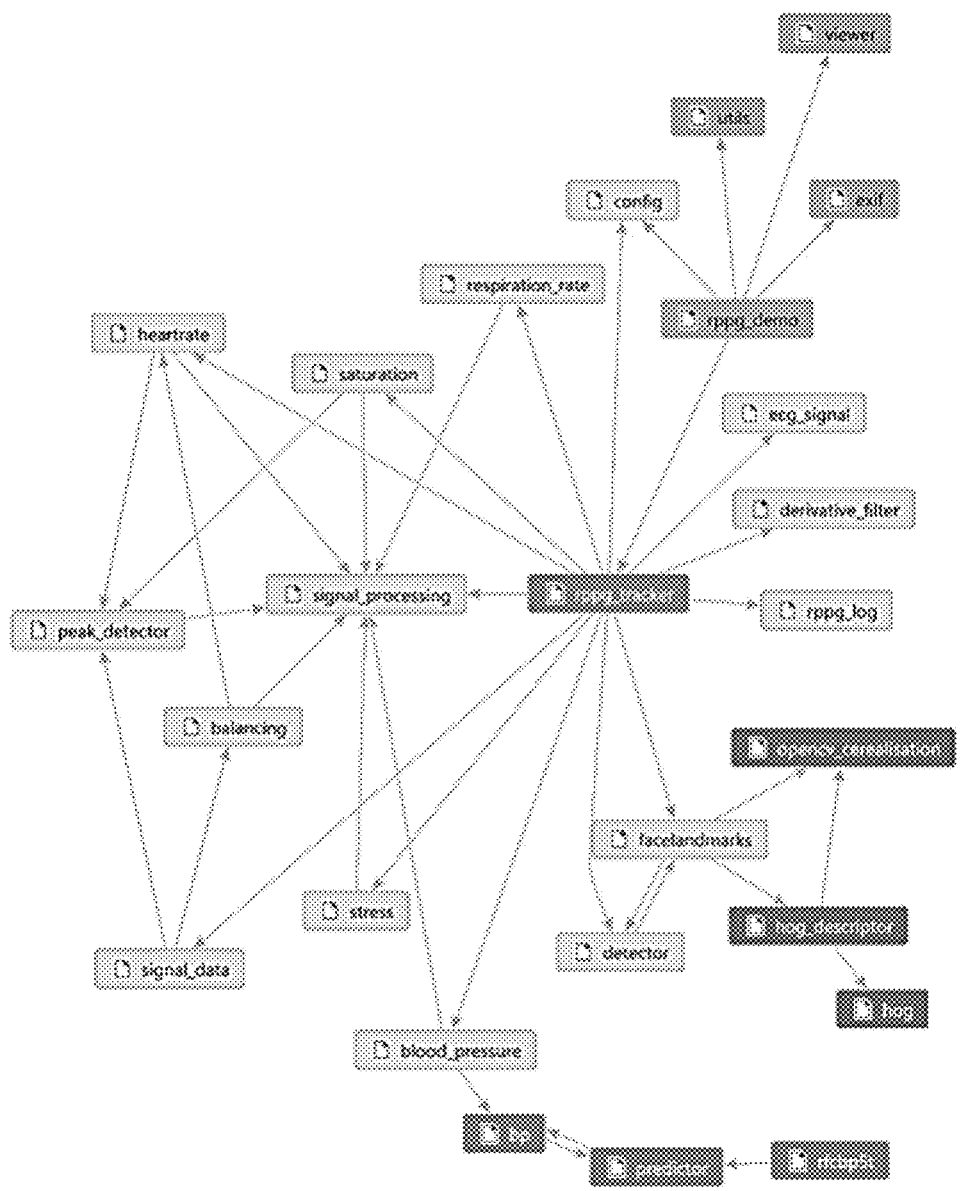
FIG. 2B depicts a data flow across an RPPG library block scheme generated with a visual studio code map, in accordance with an embodiment.

Referring to FIG. 2B, FIG. 2A depicts a schematic illustration of a system 200 for determining one or more vital signs of a user based on a video of the user by using artificial intelligence, in accordance with an embodiment of the present disclosure. The system 200 comprises an video capture device 202 associated with a computing device for capturing the vide of the user, a memory 204 operatively coupled to the video capture device 202 and configured store a set of modules and the video of the user, and a processor 206 that executes the set of modules for estimating the one or more vital signs of the user based on the video of the user using artificial intelligence. The modules comprises a face frame extraction module 208, a ROI determination module 210, a signal extraction module 212, and a vital sign estimation module 214. The face frame extraction module 208 is configured to extract a plurality of face frames and one or more time stamps from the video of the user. The ROI determination module 210 is configured to determine at least one region of interest (ROI) in the plurality of face frames using a histogram of oriented gradients. The signal extraction module 212 is configured to extract a plurality of health indicator signals by detecting volumetric changes in a peripheral blood circulation in the at least one ROI based on a remote photoplethysmography (RPPG). The vital sign estimation module 214 is configured to estimate the one or more vital signs of the user based on the plurality of health indicator signals and the one or more time stamps. The one or more vital signs comprises at least one of: a heart rate, a respiration rate, a stress level, an oxygen saturation and a blood pressure.

Optionally, the face frame extraction module 208 is further configured to receive the video of the user from the video capture device 202 and analyze the video for detecting the one or more face frames and the one or more time stamps in the video.

Optionally, the ROI determination module 210 is further configured to a) crop the plurality of face frames for generating at least one cropped face image, b) extract, using the histogram of oriented gradients (HOG), one or more HOG features from the at least one cropped face image, wherein the one or more HOG features comprises HOG descriptors for object recognition, and c) determine, at least one face landmark, a corrected face location and the at least one ROI in the corrected face location using the one or more HOG features.

Optionally, the signal extraction module 212 is further configured to a) determine the volumetric changes in blood in peripheral circulation in the at least one ROI and b) generate the plurality of health indicator signals comprising a plurality of bandgap reference (BGR) signals by processing at least one of: the corrected face location, the at least one ROI, and the one or more face landmarks based on the volumetric 15 changes in blood in peripheral circulation.

Optionally, the vital sign estimation module 214 is further configured to a) interpolate the health indicator signals with the one or more timestamps, b) execute a batch with balancing parameters using the health indicator signals to generate a fast Fourier transform (FFT) spectrum, estimate a signal to noise ratio (SNR) based on the FFT spectrum to generate an estimated SNR, c) select a spectrum with a highest SNR based on the estimated SNR and generate at least one balanced signal with the spectrum with the highest SNR, d) detect one or more peaks in the at least one balanced signal and filter one or more weak peaks from among the one or more peaks to generate a filtered signal and e) estimate the one or more vital signs based on the filtered signal.

Optionally, the vital sign estimation module 214 is further configured to extract one or more features from the one or more peaks in the filtered signal and predict a value of at least one of: a blood pressure, a heart rate, a respiration rate, a stress level, and an oxygen saturation based on the one or more features.

In an embodiment, the at least one face landmark along with the estimated one or more vital signs are rendered to the user via a user interface of the user device.

It may be understood by a person skilled in the art that the FIG. 2A is merely an example for sake of clarity, which should not unduly limit the scope of the claims herein. The person skilled in the art will recognize many variations, alternatives, and modifications of embodiments of the present disclosure.

Referring to FIG. 2B, FIG. 2B depicts a data flow across an RPPG library block scheme 216 generated with a visual studio code map, in accordance with an embodiment.

Figure 3:
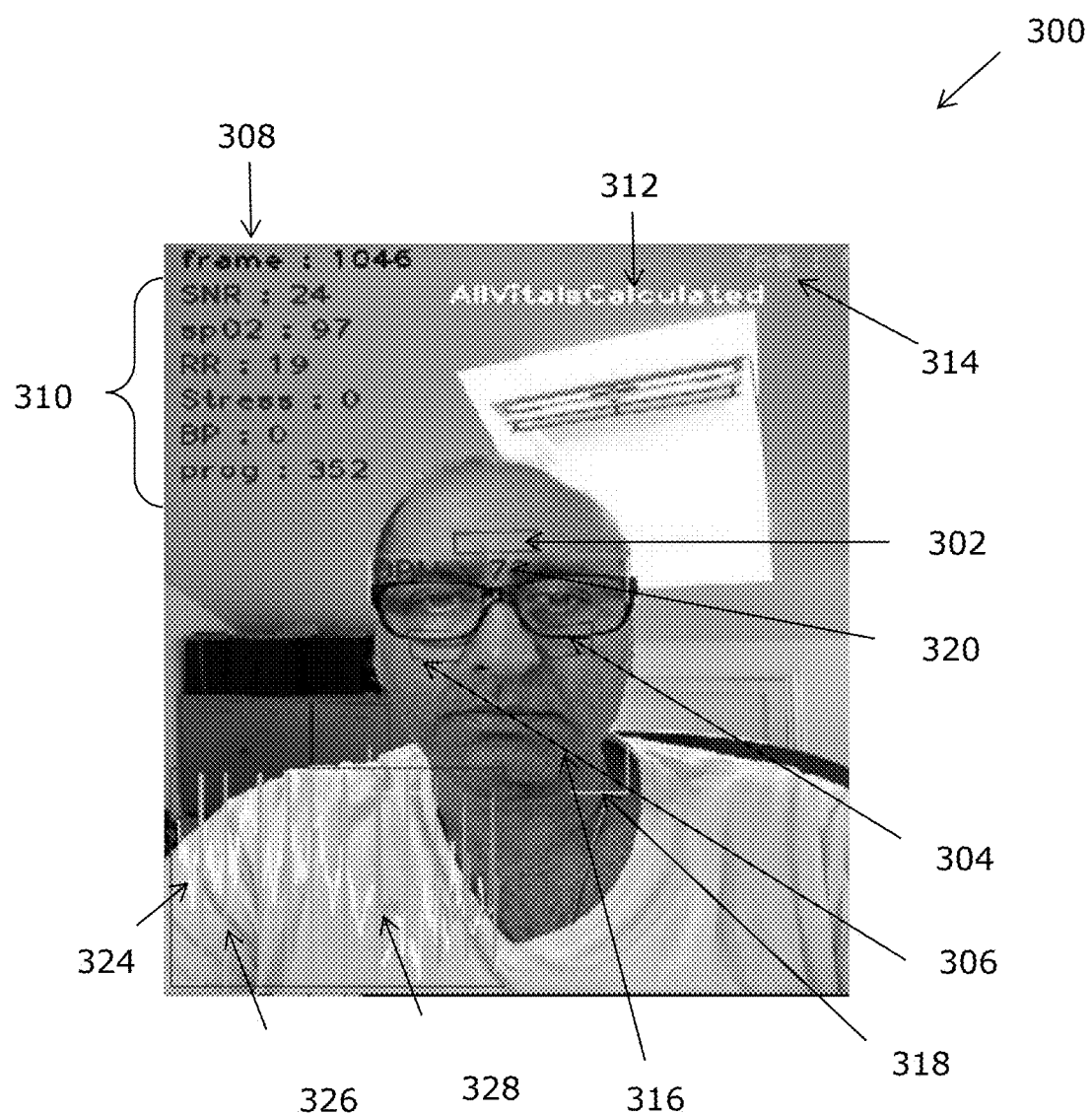
FIG. 3 illustrates an exemplary user interface view depicting one or more face landmarks along with the estimated one or more vital signs rendered to a user via a user interface of the user device, in accordance with an exemplary scenario.

Referring to FIG. 3, FIG. 3 illustrates an exemplary user interface view 300 depicting one or more face landmarks along with the estimated one or more vital signs rendered to a user via a user interface of the user device, in accordance with an exemplary scenario. As illustrated in FIG. 3, the user interface view 300 includes the face landmarks 302, 304, and 306 marked on the face of the user, an output frame with a current frame number 308 on a top left corner of the user interface view 300, and the estimated vital signs 310 including, a signal to a noise ratio (SNR) 24, an oxygen saturation (SpO2) 97, a respiration rate (RR) 19, a stress level 0, a blood pressure (BP) 0, and a library progress (prog) 352. Additionally, the user interface view 300 also includes a library status 312 on the top, an FPS rate 6 in the right top corner 314, a tracked face 316 of the user, the ROIs 318 for signal extraction, heartrate (BPM) 72 320, and an extracted signal 322 in the left bottom corner 324, a detected signal peaks 326, and a simulated echo cardiogram (ECG) signal 328.

Figure 4:
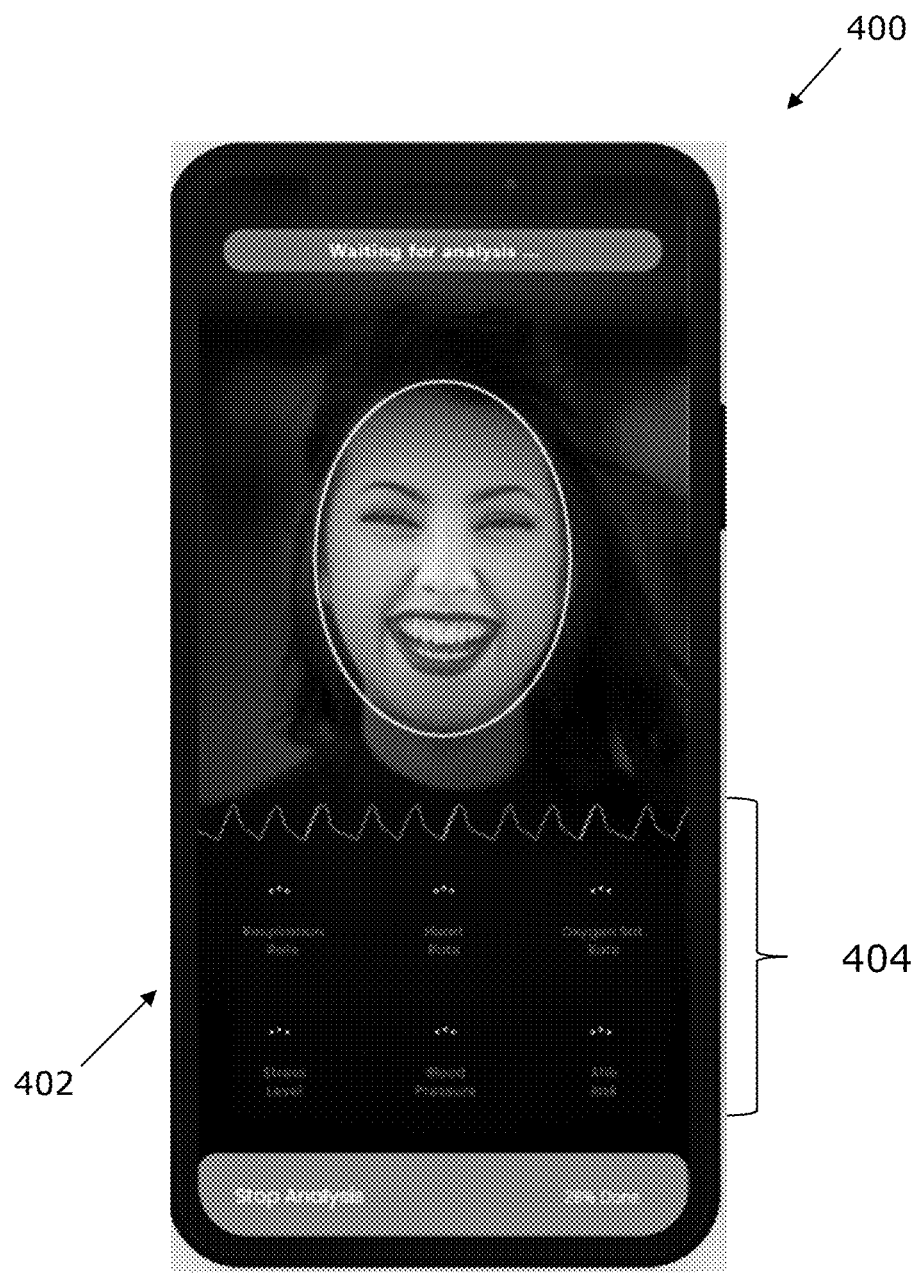
FIG. 4 depicts another exemplary user interface view rendered to a user via a user interface of a user device, such as mobile device, 20 in accordance with another exemplary scenario.

Referring to FIG. 4, FIG. 4 depicts another exemplary user interface view 400 rendered to a user via a user interface of a user device 402, such as, for example, a mobile device, in accordance with another exemplary scenario. The user interface view 400 depicts the value of the vital signs 404 estimated using the system of the present technology in an exemplary scenario.

It has to be noted that all devices, modules, and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for estimating one or more vital signs of a user based on a filtered signal obtained from a video of the user using artificial intelligence, the system comprising:
   a video capture device associated with a computing device for capturing the video of the user;
   a memory operatively coupled to the video capture device and configured to store a set of modules and the video of the user; and
   a processor that executes the set of modules for estimating the one or more vital signs of the user based on the video of the user using artificial intelligence, the set of modules comprising:
      a face frame extraction module for extracting a plurality of face frames and one or more time stamps from the video of the user;
      a ROI determination module for determining at least one region of interest (ROI) in the plurality of face frames using a histogram of oriented gradients (HOG), wherein the ROI determination module is configured to:
         crop the plurality of face frames for generating at least one cropped face image;
         extract, using the HOG, one or more HOG features from the at least one cropped face image, wherein the one or more HOG features comprises HOG descriptors for object recognition by a machine learning model; and
         determine, at least one face landmark, a corrected face location and the at least one ROI in the corrected face location, by the machine learning model using the one or more HOG features;
      a signal extraction module for extracting a plurality of health indicator signals by detecting volumetric changes in a peripheral blood circulation in the at least one ROI based on a remote photoplethysmography (RPPG); and for determining the volumetric changes in blood in peripheral circulation in at least one ROI and generate the plurality of health of indicator signals comprising a plurality of bandgap reference (BGR) signals by processing at least one of: the corrected face location, the at least one ROI, and the at least one face landmark based on the volumetric changes in blood in peripheral circulation; and
      a vital sign estimation module for estimating the one or more vital signs of the user based on the plurality of health indicator signals and the one or more time stamps executing a batch with balancing parameters using the health indicator signals to generate a fast Fourier transform (FFT) spectrum; estimate a signal to noise ratio (SNR) based on the FFT spectrum to generate an estimated SNR; select a spectrum with a highest SNR based on the estimated SNR and generating at least one balanced signal with the spectrum with the highest SNR; detect one or more peaks in the at least one balanced signal and filter one or more weak peaks from among the one or more peaks to generate the filtered signal; and estimate the one or more vital signs based on the filtered signal, using the machine learning model,
   wherein the machine learning model is trained on a dataset of known vital signs and corresponding filtered signals, and
   wherein the signal extraction module employs a multi-wave RGB camera and the RPPG to detect pulse color changes in skin of the user, and the detected pulse color changes are encoded within changes in pixel values of the video for extracting the health indicator signals.

2. The system of claim 1, wherein the one or more vital signs comprises at least one of: a heart rate, a respiration rate, a stress level, an oxygen saturation and a blood pressure.

3. The system of claim 1, wherein the face frame extraction module is further configured to:
   receive the video of the user from the video capture device; and
   analyze the video for detecting the one or more face frames and the one or more time stamps in the video.

4. The system of claim 1, wherein the vital sign estimation module is further configured to:
   extract one or more features from the one or more peaks in the filtered signal; and
   predict a value of at least one of: a blood pressure, a heart rate, a respiration rate, a stress level, and an oxygen saturation based on the one or more features.

5. A processor-implemented method of estimating one or more vital signs of a user based on a filtered signal obtained from a video of the user by using artificial intelligence, said method comprising:
   extracting a plurality of face frames and one or more time stamps from the video of the user;
   determining at least one region of interest (ROI) in the plurality of face frames using a histogram of oriented gradients (HOG), wherein determining the at least one ROI from the plurality of face frames comprises:
      generating at least one cropped face image;
      extracting, using the HOG, one or more HOG features from the at least one cropped face image, wherein the one or more HOG features comprises HOG descriptors for object recognition by a machine learning model; and
      determining, at least one face landmark, a corrected face location and the at least one ROI in the corrected face location, by the machine learning model using the one or more HOG features;
   extracting a plurality of health indicator signals by detecting volumetric changes in a peripheral blood circulation in the at least one ROI based on a remote photoplethysmography (RPPG); and
   estimating the one or more vital signs of the user based on the plurality of health indicator signals, the one or more time stamps and the filtered signal, using the machine learning model, wherein the machine learning model is trained on a dataset of known vital signs and corresponding filtered signals, and wherein the signal extraction module employs a multi-wave RGB camera and the RPPG to detect pulse color changes in skin of the user, and the detected pulse color changes are encoded within changes in pixel values of the video for extracting the health indicator signals.

6. The processor-implemented method of claim 5, wherein the one or more vital signs comprises at least one of: a heart rate, a respiration rate, a stress level, an oxygen saturation and a blood pressure.

7. The processor-implemented method of claim 5, wherein extracting the plurality of face frames comprises:
    receiving the video of the user from a video capture device; and
    analyzing the video for detecting the plurality of face frames and the one or more time stamps in the video.

8. The processor-implemented method of claim 5, wherein extracting the plurality of health indicator signals comprises:
    determining the volumetric changes in blood in peripheral circulation in the at least one ROI; and
    generating the plurality of health indicator signals comprising a plurality of bandgap reference (BGR) signals by processing at least one of: the corrected face location, the at least one ROI, and the at least one face landmark based on the volumetric changes in blood in peripheral circulation.

9. The processor-implemented method of claim 5, wherein estimating the one or more vital signs based on the plurality of health indicator signals and the one or more time stamps comprises:
    interpolating the health indicator signals with the one or more timestamps;
    executing a batch with balancing parameters using the health indicator signals to generate a fast Fourier transform (FFT) spectrum;
    estimating a signal to noise ratio (SNR) based on the FFT spectrum to generate an estimated SNR;
    selecting a spectrum with a highest SNR based on the estimated SNR and generating at least one balanced signal with the spectrum with the highest SNR; and
    detecting one or more peaks in the at least one balanced signal and filtering one or more weak peaks from among the one or more peaks to generate the filtered signal.

10. The processor-implemented method of claim 9, wherein estimating the one or more vital signs based on the filtered signal comprises:
    extracting one or more features from the one or more peaks in the filtered signal; and
    predicting a value of at least one of: a blood pressure, a heart rate, a respiration rate, a stress level, and an oxygen saturation based on the one or more features.

* * * * *